United States Patent Office 3,508,300
Patented Apr. 28, 1970

3,508,300
ENCLOSED ADJUSTABLE CLAMPING MECHANISM WITH LUBRICATING SYSTEM
Harrie Martin Allard and Henry Randall Parker, Nashua, N.H., assignors to Improved Machinery Inc., Nashua, N.H., a corporation of Delaware
Filed June 12, 1967, Ser. No. 645,347
Int. Cl. B29f 1/00, 1/06
U.S. Cl. 18—30                                             11 Claims

ABSTRACT OF THE DISCLOSURE

An injection molding machine including a clamping means or mechanism which comprises a toggle linkage and cylinder means for actuating the toggle linkage, such cylinder means being supported below the toggle linkage by supporting arms. The clamping means is immersed in lubricant to locate the connections of the supporting arms to the cylinder means in the lubricant; and lubricant is supplied onto the connections of the toggle linkage and onto the connections between the supporting arms and the platens. Also, the tie rods are longitudinally movable for providing adjustment of the space between the mold carrying platens; and a mold carrying platen is selectively driven relative to the injection unit by a cylinder-and-piston drive mechanism.

---

This invention relates to improved clamp drive mechanisms in injection molding machines.

Injection molding machines usable with molds of various thicknesses must be adjusted to accommodate each new set of molds. It is not desirable to adjust the stroke of the clamping mechanism for proper mating of each new set of molds as this mechanism is meticulously designed to impose massive forces, in the order of tens of tons, and such adjusting capabilities would increase the complexity of the mechanism. In some machines adjustment is made by moving the platen accommodating the injection unit on tie rods which connect the clamping mechanism to that platen. This places the adjusting mechanism in the already-congested area of the injection unit, where access and operation are quite difficult.

Clamping mechanisms of these machines generally employ a toggle linkage with its two outer ends connected to a fixed and a movable platen, and its center pin to a connecting rod connected to a piston in a hydraulic cylinder. The arrangement usually is such that increasing the pressure on the rod side of the piston brings the outer ends of the toggle links toward each other and opens the mold, while pressure on the other side of the piston drives the outer ends apart and closes the mold. The toggle linkage is a large but very precisely constructed mechanism and it is essential that it be kept clean and well lubricated. Portions of the linkage that protrude above the machine increase its height and are exposed to dust and corrosive elements in the atmosphere that increase wear and hasten deterioration of the linkage. The exposed joints are difficult to keep properly lubricated as well.

It is therefore a primary object of this invention to provide an injection molding machine having a toggle linkage which may be totally enclosed within the body of the machine permitting a reduction in the height of the machine and allowing total lubrication of the linkage while protecting it from dust and corrosion.

It is a further object of this invention to provide an adjustment mechanism in an injection molding machine which can quickly, easily, and uniformly adjust for each set of molds used, whose setting, once adjusted, is resistant to change by extraneous forces, and which is accessibly placed on the injection molding machine.

The invention features an injection molding machine which may include a compartment for enclosing the clamping mechanism, the clamping mechanism including a toggle linkage and a hydraulic clamping cylinder, the toggle linkage having a first link connected at its outer end to a clamping platen and a second link connected at its outer end to a moving platen, the links being pivotally interconnected at their inner ends, the clamping platen being fixed to the base of the machine and the moving platen being slidable on a guide member between the clamping platen and a second platen which is spaced from the clamping platen; the hydraulic clamping cylinder is supported from the clamping and moving platens by first and second arms, respectively, pivotally connected to the cylinder, and a lubricating system disposed within the compartment for lubricating the clamping mechanism.

In preferred embodiments, the machine may include an adjustment mechanism on the clamping platen and the guide member includes a plurality of tie rods, the second platen being attached to, and movable as a unit with, the tie rods. The adjustment mechanism may include a drive nut threadably engaged with each of the tie rods, a drive wheel connected with one of the drive nuts for rotating that drive nut and moving the associated tie rod through it, and a drive chain engaging all of the drive nuts for rotating them in unison to insure alignment of the second platen. Other embodiments may include drive means which are connected to the second platen for moving that platen and adjusting the mold setting in cooperation with the adjustment mechanism and which may be connected to the injection unit of the machine for moving the second platen and injection unit relative to each other.

Other objects, features, and advantages will appear from the following description of a preferred embodiment of the invention, taken together with the attached drawings, in which.

Figures 1, 2, 3:
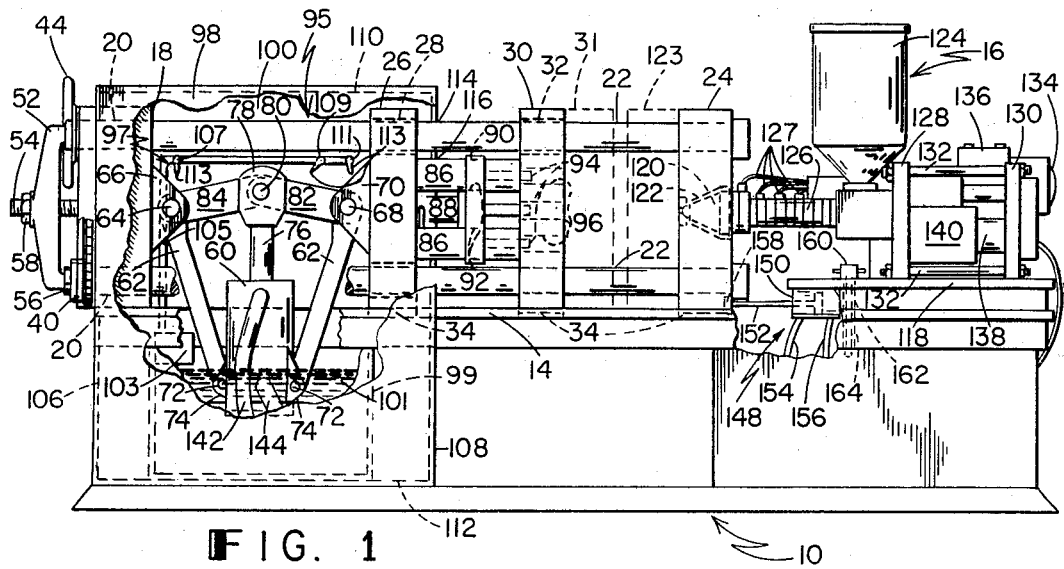
FIG. 1 is an elevation of an injection molding machine according to this invention.
FIG. 2 is a plan view of the machine of FIG. 1.
FIG. 3 is a perspective view of the end of the machine at the left of FIGS. 1 and 2.

There is shown in the drawings an injection molding machine having a base 10 which supports runners 12, having guide edges 14, and injection unit 16. Clamping platen 18 is fixed to one end of said runners and contains four bores 20 through which pass four tie rods 22. Tie rods 22 are attached to adjustable platen 24 and position it relative to clamping platen 18. They further act as guides for moving platen 26 in bores 28 and mold plate 30 in bores 32. Brass shoes 34, mounted on the bottoms of platens 24 and 26, and plate 30 prevent excessive wear of runners 12 as these members slide on them.

Tie rods 22 are moved through bores 20 in clamping platen 18 in order to position adjustable platen 24 in accordance with the thickness of particular molds. Threaded ends 36 of tie rods 22 are engaged by an adjustment mechanism which includes sprockets 38 and 42, drive nuts 40, hand wheel 44, and chain 46, and which is movable with tie rods 22 independent of platen 18. Three sprockets 38 rotatably supported by tie rods 22 are keyed to rotate with drive nuts 40 and a fourth sprocket 42 also rotatably supported by a tie rod is keyed to rotate with hand wheel 44. Rotation of hand wheel 44 rotates its associated sprocket and through chain 46 rotates sprockets 38 and drive nuts 40.

Tie rod clamps 52 mounted on threaded clamp studs 54 secured in clamping platen 18 are held firmly against bearing surfaces 56 on the ends of tie rods 22 by jam nuts 58, to prevent the tie rods from being moved relative to clamping platen 18 by forces exerted during operation of the machine.

The clamping mechanism or means of the machine includes a toggle linkage and cylinder means comprising a hydraulic cylinder 60 suspended by arms 62 from pivot pin 64 in mounting 66 on clamping platen 18 and pivot pin 68 in mounting 70 on moving plate 26. Arms 62 are pivotally connected to cylinder 60 by pins 72 in mountings 74. The force developed on the piston within cylinder 60 is communicated to the system by a connecting rod 76 and bearing 78 containing a wrist pin 80. The toggle linkage employs link 82 connected to pins 68 and 80 and link 84 connected to pins 64 and 80.

Mold plate 30 is fastened to moving platen 26 by four spacer rods 86. Hydraulic knockout cylinder 88, attached to moving platen 26, drives ejector plate 90 supported and guided by its circular recesses 92 on spaced rods 86. There are seventeen ejector points 94 (only a few are shown) carried by ejector plate 90. They are received in bores 96 in mold plate 30 and corresponding bores in mold half 31.

Side panels 98 and 100, end panels 106 and 108, cover panel 110 and base panel 112 form a compartment 95 which permits continuous lubrication of the clamp mechanism by the lubrication system 97 and protects it from atmospheric dust and corrosion. Tie rods 22 pass through apertures 114, and spacer rods 86 through apertures 116, in plate 108. At the bottom of compartment 95 is a lubricant reservoir 99 containing the lubricant 101. Lubricating system 97 draws the lubricant from reservoir 99 by means of pump 103 and delivers it through pipe 105 to conduits 107, 109, and 111 associated with pivot pins 64, 80 and 68, respectively. From conduits 107, 109, and 111 the lubricant is directed by a plurality of dispensers 113 toward the associated pins 64, 80 and 68.

Injection unit 16 is mounted on carriage 118, slidable on runners 12, to permit alignment of injector nozzle 120 in conical port 122 in adjustable platen 24. Nozzle 120 enters the mold directly through a corresponding port in mold half 123.

Dry molding material placed in hopper 124 moves into wear resistant steel barrel 126 through a feed hole. The material is heated by electric heating bands 127 which, in conjunction with the pressure applied by the usual rotating screw, not shown, within barrel 126, plasticizes the molding material. The barrel 126 and hopper 124 assembly is supported on feeder crosshead 128 mounted on carriage 118 and is connected to ram crosshead 130 by guide bars 132. The screw is driven by hydraulic motor 134 through gears in gear housing 136. The screw is rammed forward, injecting the plasticized material into the mold, by injector rams 138 slidable in injector cylinders 140. Hydraulic power is applied to the ram 138 and cylinder 140, as it is to the clamping cylinder 60, and knockout cylinder 88, by the main hydraulic system of the machine contained within base 10 below injector unit 16. Cylinder 60 is caused to close the mold by an increase in hydraulic pressure on line 142, and to open it by an increase in hydraulic pressure on line 144.

Adjustment of the mold half spacing is accomplished by rotating hand wheel 44 until the nuts 40 are displaced from platen 18 by a distance equal to the desired increase in distance at the mold area. Then cylinder 60 is pressurized to move palten 26 toward platen 24 so that mold half 31 contacts mold half 123 driving platen 24 away from platen 18 until nuts 40 once again bear on platen 18. Final adjustment may be accomplished with precision by rotating hand wheel 44 to draw platen 24 toward platen 18 for exact spacing of the mold halves. Jam nuts 58 must now be drawn up on studs 54 to secure clamps 52. Reducing the space at the mold area is accomplished by backing off jam nuts 58 a distance equal to the reduction desired and then rotating hand wheel 44 to move platen 24 and draw tie rods 22 through platen 18 until bearing surfaces 56 are again contacting clamps 52.

Increasing the pressure in line 142 drives rod 76 into cylinder 60, drawing wrist pin 80 and the associated ends of links 82 and 84 downwardly. This tends to drive pins 64 and 68 apart, resulting in moving platen 26 being driven away from fixed clamping platen 18, and closing the mold. Links 82 and 84 are nearly colinear in the closed mold condition; less than complete horizontal alignment is desirable to increase the speed of operation and avoid locking. The molds are parted by an increase in the pressure in line 144. This drives rod 76 out of cylinder 60, moving pin 68 toward pin 64, which draws moving platen 26 toward clamping platen 18, opening the mold.

Carriage 118 may be moved relative to adjustable platen 24 for proper engagement of nozzle 120 and port 122 by drive mechanism 148 including cylinder 150 and piston 152, FIG. 1. Cylinder 150 mounted on carriage 118 drives piston 152 by means of hydraulic power supplied through lines 154 and 156; piston 152 is mounted to platent 24 in block 158. Drive mechanism 148 may be caused to supply the force to move adjustable platen 24 relative to carriage 118 and clamping platen 18 for adjusting the mold space between mold halves 31 and 123 by inserting clevis pins 160 in bores 162 in carriage 118 and coperating bores 164 in base 10. With pins 160 so engaged carriage 118 cannot respond to the urgings of drive mechanism 148. Instead, the force applied by drive mechanism 148 moves platen 24.

Thus, drive means 148 may be employed to give a power assist to the manual adjustment mechanism controlled by hand wheel 44. To increase the distance between platens 24 and 26, hand wheel 44 is rotated until the distance between drive nuts 40 and platen 18 is equal to the increased distance desired at the mold area. Pressurizing cylinder 150 through line 154 drives piston 152 and platen 24 away from moving platen 26 until nuts 40 once again bear on platen 18. Clamps 52 are now brought against bearing surfaces 56 by moving jam nuts 58 toward platen 18 a distance equal to the increased distance between platens 24 and 26.

Decreasing the distance between platens 24 and 26 is accomplished by moving jam nuts 58 away from clamps 52 a distance equal to the desired decrease between platens 24 and 26 and pressurizing cylinder 150 through line 156. This action drives piston 152 and platen 24 towards moving platen 26 until bearing surfaces 56 of tie rods 22 once again engage clamps 52; hand wheel 44 is now rotated until drive nuts 40 again bear on platen 18.

Removing clevis pins 160 when jam nuts 52 and drive nuts 40 are drawn up tight permits drive mechanism 148 to be used to move carriage 118 toward and away from platen 24 for proper positioning of nozzle 120 in port 122.

Other embodiments will occur to those skilled in the art and are within the following claims.

What is claimed is:

1. An injection molding machine comprising a clamping platen, a second platen spaced from said clamping platen, a moving platen positioned and movable between said clamping and second platens, clamping means including a toggle linkage actuatable for moving said moving platen and cylinder means for actuating said toggle linkage, said toggle linkage including first and second links having inner ends and outer ends, said first link being connected at its outer end to said clamping platen and said second link being connected at its outer end to said moving platen, said links being pivotally interconnected at their inner ends, a first supporting arm connected at opposite ends to said clamping platen and said cylinder means, a second supporting arm connected at opposite ends to said moving platen and said cylinder means, said supporting arms supporting said cylinder means from said clamping platen and said moving platen, and means defining a compartment enclosing said clamping means, said compartment containing lubricant at a level to cause said clamping means to be sufficiently immersed in the lubricant to locate connections of said clamping means in the lubricant.

2. An injection molding machine according to claim 1, wherein said clamping means is only partially immersed in the lubricant whereby other connections of said clamping means are out of such lubricant, and means are provided for directing lubricant on said other connections of said clamping means.

3. An injection molding machine according to claim 2, wherein said lubricant directing means includes dispensing means for directing lubricant onto said connections of said links and onto the connections of said supporting arms to said platens.

4. An injection molding machine comprising a clamping platen, a second platen spaced from said clamping platen, a moving platen positioned and movable between said clamping and second platens, clamping means including a toggle linkage actuatable for moving said moving platen and cylinder means for actuating said toggle linkage, said toggle linkage including first and second links having inner ends and outer ends, said first link being connected at its outer end to said clamping platen and said second link being connected at its outer end to said moving platen, said links being pivotally interconnected at their inner ends, a first supporting arm connected at opposite ends to said clamping platen and said cylinder means, a second supporting arm connected at opposite ends to said moving platen and said cylinder means, said supporting arms supporting said cylinder means below said interconnection of said links, means defining a compartment enclosing said clamping means, said compartment containing lubricant at a level to cause the connections of said supporting arms to said cylinder means to be immersed in the lubricant and said connections of said links to be above the level of such lubricant, and means for supplying lubricant to said connections of said links.

5. An injection molding machine according to claim 4, wherein said lubricant supplying means comprises a lubricant conveying conduit associated with each of said connections of said links, each of said conduits being provided with a plurality of dispensers for directing the lubricant onto its associated connection.

6. An injection molding machine according to claim 5, wherein the connections of said supporting arms to said platens are arranged such that said dispensing means directs lubricant thereon.

7. An injection molding machine according to claim 4, further comprising a plurality of tie rods connected to said second platen for movement therewith, said tie rods extending through openings in said moving and clamping platens and having ends on the opposite side of said clamping platen from said second platen, and adjustment means including a drive nut threadedly connected to each of said tie rod ends, a drive wheel associated with one of said drive nuts for rotatably driving the latter, a drive chain connecting all of said drive nuts whereby rotation of said one drive nut provides simultaneous rotation of all thereof, a clamp stud mounted on said clamping platen, a clamp mounted on said clamp stud and bearing on the tie rod ends, and a jam nut on said clamp stud and securing said clamp against said tie rod ends to prevent longitudinal movement of said tie rods.

8. An injection molding machine according to claim 7, wherein there are a plurality of said clamp studs, clamps and jam nuts, each clamp, clamp stud and jam nut being associated with a pair of tie rods and each of said clamps having two bearing surfaces, one for each tie rod associated therewith.

9. An injection molding machine comprising a clamping platen, a second platen spaced from said clamping platen, a moving platen positioned and movable between said clamping and second platens, a plurality of tie rods connected to said second platen for movement therewith, said tie rods extending through openings in said moving and clamping platens and having ends on the opposite side of said clamping platen from said second platen, and adjustment means including a drive nut threadedly connected to each of said tie rod ends, a drive wheel associated with one of said drive nuts for rotatably driving such one drive nut, a drive chain connecting all of said drive nuts whereby rotation of said one drive nut provides simultaneous rotation of all thereof, a clamp stud connected to said clamping platen, a clamp mounted on said clamp stud and bearing on the tie rod ends, and a jam nut on said clamp stud and securing said clamp against said tie rod ends to prevent longitudinal movement of said tie rods.

10. An injection molding machine according to claim 9, wherein there are a plurality of said clamp studs, clamps and jam nuts, each clamp, clamp stud and jam nut being associated with a pair of tie rods and each of said clamps having two bearing surfaces, one for each tie rod associated therewith.

11. An injection molding machine according to claim 9, further comprising an injection unit, means for preventing movement of said injection unit relative to said second platen, and drive means for moving said second platen relative to said injection unit.

References Cited

UNITED STATES PATENTS

| | | | |
|---|---|---|---|
| 3,034,175 | 5/1962 | Hehl | 18—30 |
| 3,093,863 | 6/1963 | Ehlert | 18—30 |
| 3,162,900 | 12/1964 | Huelskamp | 18—30 |
| 3,335,463 | 8/1967 | Allard et al. | 18—30 |

FOREIGN PATENTS

| | | |
|---|---|---|
| 1,364,694 | 5/1964 | France. |
| 639,348 | 5/1962 | Italy. |

J. SPENCER OVERHOLSER, Primary Examiner

M. O. SUTTON, Assistant Examiner

U.S. Cl. X.R.

29—260, 261; 254—29.5